United States Patent [19]

Goertz et al.

[11] Patent Number: 4,908,413

[45] Date of Patent: Mar. 13, 1990

[54] PREPARATION OF COPOLYMERS OF MONOALKYL MALEATES AND VINYL ALKYL ETHERS

[75] Inventors: Hans-Helmut Goertz, Freinsheim; Ferdinand Straub, Hockenheim; Friedrich Vogel, Wachenheim; Franz Frosch, Ludwigshafen; Paul Naegele, Otterstadt; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 251,754

[22] Filed: Oct. 3, 1988

[30] Foreign Application Priority Data

Oct. 1, 1987 [DE] Fed. Rep. of Germany ....... 3733158

[51] Int. Cl.$^4$ .................... C08F 20/08; C08F 22/04
[52] U.S. Cl. .................... 525/304; 525/327.7; 525/376
[58] Field of Search ............ 525/327.7, 376, 304

[56] References Cited

U.S. PATENT DOCUMENTS

| | | | |
|---|---|---|---|
| 2,694,697 | 11/1954 | Grosser et al. | 430/4 |
| 2,694,698 | 11/1954 | Grosser et al. | 526/77 |
| 3,499,876 | 3/1970 | Field et al. | 526/271 |
| 3,530,102 | 9/1970 | Welch et al. | 526/272 |
| 3,632,561 | 1/1972 | Gibb et al. | 526/219.4 |
| 3,741,940 | 6/1973 | Heilman | 525/327.7 |

FOREIGN PATENT DOCUMENTS

| | | |
|---|---|---|
| 540101 | 7/1936 | Fed. Rep. of Germany . |
| 1770891 | 2/1970 | Fed. Rep. of Germany . |
| 1930009 | 9/1970 | Fed. Rep. of Germany . |
| 43-25982 | 11/1968 | Japan . |
| 712220 | 7/1954 | United Kingdom . |
| 863379 | 3/1961 | United Kingdom . |
| 1233468 | 5/1971 | United Kingdom . |

*Primary Examiner*—Joseph L. Schofer
*Assistant Examiner*—Jeffrey Smith
*Attorney, Agent, or Firm*—Oblon, Spivak, McClelland, Maier & Neustadt

[57] ABSTRACT

Copolymers of monoalkyl maleates and vinyl alkyl ethers are prepared by free radical copolymerization of maleic anhydride and a vinyl alkyl ether followed by reaction with an alkanol, by a process in which the vinyl alkyl ether component is present in excess in the reaction mixture in each phase of the polymerization, the free radical copolymerization is carried out in acetone and the acetone is removed by distillation during or after ester formation at up to 70° C.

11 Claims, No Drawings

PREPARATION OF COPOLYMERS OF MONOALKYL MALEATES AND VINYL ALKYL ETHERS

The present invention relates to a process for the preparation of copolymers of monoalkyl maleates and vinyl alkyl ethers.

Copolymers of vinyl methyl ether and monoalkyl maleates, in particular ethyl maleate, isopropyl maleate and butyl maleate, are used extensively as film-forming resins in hairsprays. Such substances are usually prepared by reacting a copolymer of vinyl methyl ether and maleic anhydride with the corresponding alcohol. For example, British Pat. No. 863,379 describes the reaction of a maleic anhydride/vinyl methyl ether copolymer with methanol, of a maleic anhydride/vinyl methyl ether copolymer with ethanol, of a maleic anhydride/vinyl methyl ether copolymer with isopropanol, of a maleic anhydride/vinyl methyl ether copolymer with n-butanol and of a maleic anhydride/vinyl ethyl ether copolymer with methanol, each of the pulverulent polymeric anhydrides being dissolved in an excess of the particular alcohol at room temperature or elevated temperatures. Japanese Preliminary Published Application No. 25 982/68 describes the corresponding reaction with gaseous alcohols. British Pat. No.1,233,468 describes the same reaction but in an inert reaction medium in which the polymer is insoluble. In German Laid-Open Application DOS No. 1,930,009, the reaction is carried out with primary alcohols in isopropanol as solvent. In every case, the common feature of all these processes is that a pulverulent polymeric anhydride, for example the alternating copolymer of maleic anhydride and vinyl methyl ether, is used as starting material. The preparation of this anhydride is likewise known. A copolymerization of maleic anhydride with vinyl ethers, for example the polymerization of maleic anhydride with vinyl ethyl ether in the absence of a solvent, was described as early as German Pat. No. 540,101. British Pat. No. 712,220 claims a process in which maleic anhydride is polymerized with a vinyl ether in a solvent. In all Examples, benzene is mentioned as the solvent. Benzene is in fact ideal for the polymerization of maleic anhydride with vinyl methyl ether. In benzene, the polymerization takes place as precipitation polymerization, i.e. a suspension of the polymeric anhydride in benzene is obtained, from which suspension the anhydride can be obtained by drying. Because of its low chain transfer constant, benzene also permits the preparation of very high molecular weight products. Another very great advantage is that benzene can be readily obtained in anhydrous form, which is very important for trouble-free polymerization. All these advantages result in the copolymerization of maleic anhydride with vinyl methyl ether being carried out industrially as a precipitation polymerization in benzene. The solid products obtained by drying still contain up to about 1% by weight of benzene. The esters obtained from such solid products thus also contain benzene, although in small amounts in some cases. Since it has long been known that benzene can cause cancer in humans, its presence in cosmetic products, e.g. hair sprays, is completely undesirable.

It is an object of the present invention to provide a process for the preparation of benzene-free copolymers of monoalkyl maleates and vinyl alkyl ethers.

We have found that this object is achieved by a process for the preparation of copolymers of monoalkyl maleates and vinyl alkyl ethers by free radical copolymerization of maleic anhydride and a vinyl alkyl ether followed by reaction with an alkanol, wherein the vinyl alkyl ether component is present in excess in the reaction mixture in each phase of the polymerization, the free radical copolymerization is carried out in acetone and the acetone is removed by distillation during or after ester formation at up to 70° C.

The novel preparation of copolymers of alkyl maleates and vinyl alkyl ethers is carried out in a conventional manner in two stages, i.e. the free radical polymerization of maleic anhydride with the appropriate vinyl ether and the esterification of the resulting polymeric anhydride with an alcohol. In contrast to the conventional processes, however, the novel process dispenses with isolation of polymeric anhydride as a solid. The polymerization is immediately followed by the esterification. The end product generally desired is not a copolymer of the monoalkyl maleate and the alkyl vinyl ether as such but its solutions in an alcohol (ethanol or isopropanol), according to the intended use. However, like all protic solvents, alcohols are unsuitable as a reaction medium for the polymerization stage, since they react with the maleic anhydride. The resulting acid groups decompose the vinyl ether, so that polymerization comes to a stop. Accordingly, the polymerization must be carried out using a different solvent which is inert and can be separated off from the relevant alcohol in a simple manner by distillation. Particularly suitable solvents here are those which have a lower boiling point than ethanol. Examples of suitable solvents are esters, such as methyl formate, ethyl formate and methyl acetate. Ethers, such as dimethyl ether, diethyl ether and methyl tert-butyl ether, hydrocarbons, such as pentane, and ketones, such as acetone. The stated solvents generally lead to precipitation polymers, with the exception of methyl acetate and acetone, both of which give polymer solutions. In the present case, solution polymerization has the advantage that the polymers can be prepared in substantially higher concentration. Methyl acetate is less suitable since it tends to undergo transesterification under the conditions of the ester formation following polymerization, on the one hand methanol being formed, which can undergo an undesirable reaction with the polymeric anhydride, and on the other hand sparingly volatile acetates of higher alcohols resulting, which are difficult to remove.

The difficulties mentioned are avoided with the use of acetone, which can readily be separated off from ethanol or isopropanol by distillation.

The use of acetone as a solvent for the polymerization of maleic anhydride with a vinyl alkyl ether is not novel per se. The fact that a copolymer of maleic anhydride and a vinyl ether is soluble in acetone is already stated in U.S. Pat. No. 2,047,398. British Pat. No. 712,220 claims a process in which a vinyl ether is metered into a solution of maleic anhydride in a solvent in the presence of an organic peroxide. The solvents mentioned include lower alkyl ketones, such as acetone or methyl ethyl ketone. However, in the Examples mentioned, benzene is used as solvent, without exception.

German Laid-Open Application No. DOS 1,770,891 claims, inter alia, terpolymers of maleic anhydride, methyl vinyl ether and lauryl vinyl ether and a process for their preparation, one of the solvents mentioned being acetone. In this case too, the vinyl ether is metered into the solution of the maleic anhydride in the presence of a polymerization catalyst. However, in the Examples, exclusively toluene and 1,2-dichloroethane are mentioned as solvents.

If, on the basis of the patent publications cited, it can be taken as a known fact that maleic anhydride can be copolymerized with vinyl ethers in acetone, attempts to carry out the polymerization as, for example, in Example 1 of British Pat. No. 712,220, but using acetone instead of benzene as a solvent, or similarly to Example 5 of German Laid-Open Application No. DOS 1,770,891, but using acetone instead of toluene as a solvent, will nevertheless give a disappointing result. It will in fact be found that, under these reaction conditions, the substantial part of the maleic anhydride does not undergo reaction.

In fact, it was found, surprisingly, that complete conversion of the maleic anhydride is achieved only if the vinyl ether is present in excess in the reaction mixture in each phase of the polymerization. The total excess amount of the vinyl ether may be up to 15 mol % but is preferably up to 10 mol %. Under these conditions, surprisingly, the water content of industrial acetone, which is about 0.3% by weight, presents no problems. The polymerization can be carried out at the boiling point of the mixture, although the yield of the polymer is not optimal in this case too, even if the vinyl ether is constantly present in excess. The best result is obtained if the polymerization is carried out under superatmospheric pressure. The temperature should be from 50° to 100° C., preferably from 55° to 75° C. The pressure is about 1–3 bar. When the process is carried out under superatmospheric pressure, it is not advisable to fill the reaction vessel with the total amount of the monomers, since this results in the reaction readily going out of control. Advantageously, a small amount of the monomers is initially taken and the remainder is metered in over several hours. The maleic anhydride can be metered in liquid form or added as a solution in toluene. The vinyl alkyl ether is added in liquid form; in the case of methyl vinyl ether, introduction below the surface of the reaction mixture is more advantageous than introduction in the gas phase.

Particularly suitable polymerization initiators are azo compounds, such as 2,2'-azobisobutyronitrile, 2,2'-azobis-(2,4-dimethylvaleronitrile), 2,2'-azobis(4-methoxy-2,4-dimethylvaleronitrile), 1,1'-azobis-(1-cyclohexanecarbonitrile) and dimethyl-2,2'-azobis-(isobutyrate). 2,2'-Azobis-(2,4-dimethylvaleronitrile) is particularly preferred. Peroxy-containing initiators are generally less suitable since direct and uniform starting of the polymerization is difficult to achieve with such initiators, for example with tert-butyl perpivalate.

The concentration of the resulting polymer may be up to 70% by weight, depending on the molecular weight and structure, but a concentration of from 25 to 55% by weight is preferred.

Particularly suitable vinyl alkyl ethers are methyl

Particularly suitable vinyl alkyl ethers are methyl vinyl ether, ethyl vinyl ether, butyl vinyl ether, isobutyl vinyl ether, 2-ethylhexyl vinyl ether, dodecyl vinyl ether and octadecyl vinyl ether. Methyl vinyl ether is very particularly preferred. It is also possible to use mixtures of different vinyl alkyl ethers.

After the end of the polymerization, some of the acetone is advantageously distilled off, the excess vinyl ether used also being removed when low boiling vinyl alkyl ethers are employed. Depending on the structure and molecular weight of the polymer, the solution can be evaporated down to a concentration of 80, preferably from 50 to 70, % by weight.

The distillation can be carried out under atmospheric or reduced pressure, and in each case the temperature to which the product is subjected must be kept as low as possible. The alkanol with which ester formation is intended to take place is then added to the highly viscous solution. Lower alkanols of 1 to 4 carbon atoms, in particular ethanol, isopropanol and n-butanol, are preferred here. If the same alcohol is subsequently also to serve as a solvent in the end product, the alcohol may be added in a large excess of 100% or more. However, if the alcohol is only intended to be used for esterification and not as a solvent, a large excess should be avoided. In this case, an excess of the alcohol of not more than 5 mol %, based on the anhydride groups, is preferred.

The polymeric anhydride is insoluble in, for example, ethanol. When ethanol is added, a viscous heterogeneous mass therefore forms from the solution of the anhydride in acetone, the said mass only becoming homogeneous and clear in the course of the esterification.

Regarding the esterification as such, it may be stated that it is advantageously carried out in the presence of a relevant conventional catalyst, in particular an acidic catalyst, a particularly suitable catalyst of this type being, for example, sulfuric acid or toluenesulfonic acid.

The alcohol is advantageously added at from 50° to 70° C. According to the invention, if the same alcohol subsequently also serves as solvent, it is then possible to begin the removal of the acetone by distillation, even if the esterification is still not complete. Temperature control at this stage is extremely important for the color of the end product. According to the invention, the reaction mixture now must not exceed 70° C. This is achieved by carrying out the distillation under slightly reduced pressure, for example 500 mbar. To avoid alcohol losses, it is advantageous to use a column for this purpose. Alcohol is added to the reaction mixture to avoid an excessively sharp increase in the viscosity. This addition may be made continuously or, if required, batchwise. Once the major part of the acetone has been removed, for example to a residual content of less than 2%, preferably less than 1%, the temperature can safely be increased, for example to 80°–100° C., in order to complete the esterification. The color will now no longer deteriorate as a result of the high temperature. After the end of the reaction, the polymer content of the solution can be adjusted to the desired value by adding alcohol.

If the alcohol used for the esterification is not the same as that to be used as a solvent, after the addition of the esterification alcohol the mixture is first stirred until esterification is complete before the distillation is begun, as described above.

The solutions prepared by the process described have only a pale yellow coloration. If desired and necessary, further lightening of the color can be obtained by treatment with small amounts of hydrogen peroxide.

The alcoholic solutions of copolymers of monoalkyl maleates and vinyl alkyl ethers, obtained by the novel process, are completely equivalent in the physical properties and performance characteristics to the corresponding ones obtained according to the prior art described above. They differ in that they do not contain any benzene but small amounts of acetone, which is acceptable.

All K values stated below were determined at a concentration of 1 g/100 ml in cyclohexanone at 25° C. according to Fikentscher.

EXAMPLE 1

A 220 l stirred steel vessel which was equipped with metering apparatuses and automatic internal temperature control was rendered oxygen-free by flushing with nitrogen. Thereafter, 7 l of acetone were initially taken. 3 l of a solution of 20 kg of maleic anhydride in 28 kg of acetone, which served as feed 1, were added. Feed 2 consisted of 17.6 l of vinyl methyl ether, of which 1 l was added. The initially taken mixture was then heated to 65° C. under superatmospheric pressure. At 60° C., 1 l of feed 3, which consisted of 300 g of 2,2'-azobis-(2,4-dimethylvaleronitrile) in 6 kg of acetone, was added. Initial polymerization was carried out for 15 minutes at 65° C., after which, at this internal temperature, feed 1 and feed 2 were introduced in the course of 4 hours and feed 3 in the course of 6 hours. Because of the exothermic reaction, the bath temperature during the first 4 hours was always about 5° C. lower than the internal temperature. The pressure was constant at about 2 bar. After the end of the polymerization, the pressure was carefully let down and about 15 l of acetone were distilled off under atmospheric pressure. A virtually colorless polymer solution having a solids content of 64.3% was obtained. The K value of the polymer was 41.2. The content of monomeric maleic anhydride in the solution was 0.4% by weight.

40 g of p-toluenesulfonic acid in 20 l of ethanol were added to this polymer solution at 56° C. in the course of 1 hour, resulting in a viscous pasty heterogeneous mass, which slowly became more homogeneous in the course of stirring for 4 hours at this temperature. After these 4 hours, distillation under 500 mbar was begun, and 10 l of ethanol were added whenever the limit of stirrability was reached (6 times in total). The internal temperature was kept at 50°–55° C. 90 l of acetone/ethanol mixture were distilled off in total. After the end of the distillation, the mixture was heated at 100° C. for 2 hours under superatmospheric pressure. After the solution had been cooled, its solid content was brought to 50% with ethanol. The resulting polymer had a K value of 37.9. The acid number was 154 mg of KOH/g. The solution still contained 1% of acetone, was only very pale yellowish and had a color number of 1 on the iodine scale.

EXAMPLE 2

A 220 l stirred steel vessel which was equipped with metering apparatuses and automatic internal temperature control was rendered oxygen-free by flushing with nitrogen. Thereafter, 5 l of acetone were initially taken. 3 l of a solution of 20 kg of maleic anhydride in 25 kg of acetone, which served as feed 1, were added. Feed 2 consisted of 17.6 l of vinyl methyl ether, of which 1 l was added. The initially taken mixture was then heated to 65° C. under superatmospheric pressure. At 60° C., 1 l of feed 3, which consisted of 300 g of 2,2'-azobis-(2,4-dimethylvaleronitrile) in 6 kg of acetone, was added. Initial polymerization was carried out for 15 minutes at 65° C., after which, at this internal temperature, feed 1 and feed 2 were introduced in the course of 4 hours and feed 3 in the course of 6 hours. Because of the exothermic reaction, the bath temperature during the first 4 hours was always about 5° C. lower than the internal temperature. The pressure was constant at about 2 bar. After the end of the polymerization, the pressure was carefully let down and about 15 l of acetone were distilled off under superatmospheric pressure. A polymer solution having a pale pink coloration and a solids content of 57.9% was obtained. The K value of the polymer was 54.1. The content of monomeric maleic anhydride in the solution was 0.06% by weight.

15.9 kg of n-butanol and 40 g of p-toluenesulfonic acid were added to this polymer solution in the course of 30 minutes at 56° C. Thereafter, the mixture was heated at 110° C. for 4 hours under superatmospheric pressure. After the mixture had been cooled to 60° C., acetone was distilled off under about 500 mbar and ethanol was added, as required, in 10 l portions, so that the mixture always remained stirrable. 70 l of acetone/ethanol mixture were distilled off in total, the temperature in the solution being from 50° to 55° C. 1.2 kg of 30% strength hydrogen peroxide were then added and the mixture was heated at 90° C. for 2 hours under superatmospheric pressure. After the solution had been cooled, the solids content was brought to 50% with ethanol. The resulting polymer had a K value of 48.6. The acid number of the solution was 125 mg of KOH/g. The solution contained 5.2% of butanol and 1.9% of acetone, was pale yellowish and had a color number of from 1 to 2 on the iodine color scale.

EXAMPLE 3

A 220 l stirred steel vessel which was equipped with metering apparatuses and automatic internal temperature control was rendered oxygen-free by flushing with nitrogen. Thereafter, 7 l of acetone were initially taken. 3 l of a solution of 20 kg of maleic anhydride in 28 kg of acetone, which served as feed 1, were added. Feed 2 consisted of 17.6 l of vinyl methyl ether, of which 1 l was added. The initially taken mixture was then heated to 65° C. under superatmospheric pressure. At 60° C., 1 l of feed 3, which consisted of 300 g of 2,2'-azobis-(2,4-dimethylvaleronitrile) in 6 kg of acetone, was added. Initial polymerization was carried out for 15 minutes at 65° C., after which, at this internal temperature, feed 1 and feed 2 were introduced in the course of 4 hours and feed 3 in the course of 6 hours. Because of the exothermic reaction, the bath temperature during the first 4 hours was always about 5° C. lower than the internal temperature. The pressure was constant at about 2 bar. After the end of the polymerization, the pressure was carefully let down and about 15 l of acetone were distilled off under atmospheric pressure. A virtually colorless viscous polymer solution having a solids content of 60.4% was obtained. The K value of the polymer was 40.8. The content of monomeric maleic anhydride in the solution was 0.045% by weight.

40 g of sulfuric acid, dissolved in 25 l of isopropanol, were added to this polymer solution in the course of 30 minutes, resulting in a viscous heterogeneous mass, which was stirred for 4 hours at 60° C. After these 4 hours, distillation under 500 mbar was begun, 10 l portions of isopropanol being added whenever the limit of stirrability was reached; the internal temperature was kept at 55°–60° C. during this procedure. 65 l of acetone/isopropanol mixture were distilled off in total. After the end of distillation, 500 g of 50% strength hydrogen peroxide were added and the mixture was heated at 100° C. for 2 hours under superatmospheric pressure. Cooling gave a clear, slightly yellowish viscous solution having a polymer content of 54.1% by weight and an acid number of 156 mg of KOH/g. The resulting polymer had a K value of 41.2. The solution had a color number of from 2 to 3 on the iodine scale.

EXAMPLE 4

100 g of acetone were initially taken in a 1 l stirred glass vessel provided with a stirrer, a reflux condenser and metering apparatuses. A solution, which served as feed 1, was prepared from 120 g of maleic anhydride and 150 g of acetone. A solution of 1.8 g of 2,2'-azobis-(2,4-dimethylvaleronitrile) in 97 g of vinyl ethyl ether served as feed 2. 50 ml of feed 1 and 30 ml of feed 2 were added to the initially taken mixture, which was then heated at the boil. After the mixture had been boiled for 10 minutes, feed 1 and feed 2 were then metered in simultaneously over 3 hours, the mixture constantly being kept boiling gently. When the addition was complete, a solution of 0.3 g of 2,2'-azobis-(2,4-dimethylvaleronitrile) in 25 g of acetone was added in the course of 1 hour and stirring was then continued for 1 hour, all procedures being carried out with gentle boiling. Thereafter, 40 ml of solvent were distilled off. A clear pale yellow viscous solution having a polymer content of 44.5% by weight was obtained. The content of monomeric maleic anhydride in the solution was 0.2% by weight.

0.2 g of p-toluenesulfonic acid, dissolved in 130 g of ethanol, was added to the solution in the course of 30 minutes and the mixture was stirred for 4 hours at 65° C. The solvent was then distilled off under 500 mbar, 200 g of ethanol being added a little at a time in 5 portions in order to keep the mixture stirrable. 270 g of solvent were distilled off in total. After the end of the distillation, 6 g of a 30% strength hydrogen peroxide solution were added and the mixture was heated at the boil for 3 hours. A pale yellow viscous solution having a polymer content of 48.3% by weight and an acid number of 132 mg of KOH/g was obtained. The K value of the polymer was 49.5. The color number of the solution on the iodine scale was 2.

COMPARATIVE EXAMPLE 1

250 g of acetone and 100 g of maleic anhydride were initially taken in a stirred 1 l glass flask equipped with a stirrer, a reflux condenser cooled to $-15°$ C., 2 dropping funnels, one of which was cooled to $-15°$ C., and a thermometer. 80 ml of vinyl methyl ether were condensed in the cooled dropping funnel. A solution of 1.2 g of 2,2'-azobis-(2,4-dimethylvaleronitrile) in 100 ml of acetone was added to the other dropping funnel. The initially taken mixture was heated to 56° C. Thereafter, 5 ml of vinyl methyl ether and 10 ml of initiator solution were added and stirring was carried out for 15 minutes. The remaining vinyl methyl ether was then metered in over 6 hours and the remaining initiator solution in the course of 8 hours, the internal temperature being kept at 60°-62° C. After the end of the addition, stirring was continued for a further 2 hours at the same temperature. A viscous, brown solution having a solids content of 33% was obtained. The K value of the polymer was 26.4. The content of monomeric maleic anhydride in the solution was 6.3.

0.2 g of p-toluenesulfonic acid, dissolved in 100 ml of ethanol, was added to this solution. The resulting viscous, heterogeneous mass was heated at the boil and the solvent was distilled off until the distillation temperature had increased to 78° C. Whenever the limit of stirrability was reached, 50 ml of ethanol were added, the total amount added being 350 ml. Refluxing was then continued for a further 4 hours. A clear viscous polymer solution having a polymer content of 53.5% by weight was obtained. The K value of the polymer was 22. The solution was very discolored and had a color number of 25 on the iodine scale. 4 g of 50% strength hydrogen peroxide solution were added and the mixture was boiled for a further 2 hours. Thereafter, the solution had a pronounced yellow coloration and a color number of 7 on the iodine scale.

COMPARATIVE EXAMPLE 2

210 g of acetone were initially taken in an apparatus equipped as in Comparative Example 1. A solution of 100 g of maleic anhydride in 40 g of acetone served as feed 1. Feed 2 comprised 80 ml of vinyl methyl ether and feed 3 was a solution of 1.2 g of 2,2'-azobis-(2,4-dimethylvaleronitrile) in 80 g of acetone. The initially taken substance was heated to 56° C. Thereafter, 25 ml of feed 1, 15 ml of feed 2, and 10 ml of feed 3 were added in succession and stirring was carried out for 15 minutes at 56° C., after which feed 1 and feed 2 were metered in over 4 hours and feed 3 in the course of 8 hours. The internal temperature was kept at 56° C., the vapor temperature temporarily decreasing to 43° C. and then increasing again to 56° C. Stirring was continued for a further 2 hours at this temperature. A viscous, reddish polymer solution having a solids content of 33.2% was obtained. The K value of the polymer was 48.8. The content of monomeric maleic anhydride in the solution was 3.0.

0.4 g of sulfuric acid and 100 ml of ethanol were added to this solution. The resulting viscous heterogeneous mass was heated at the boil. The solvent was distilled off until a distillation temperature of 78° C. was reached. During the distillation, 100 ml of ethanol were added four times altogether in order to keep the mixture stirrable. Thereafter, refluxing was continued for a further 4 hours. A clear viscous solution having a polymer content of 46.8% by weight was obtained. The K value of the polymer was 43.2. The solution was strongly colored and had a color number of 20 on the iodine scale. 4 g of 50% strength hydrogen peroxide solution were added and boiling was continued for a further 2 hours. Thereafter, the solution had a less intense yellow coloration and a color number of 6 on the iodine scale.

COMPARATIVE EXAMPLE 3

A 220 l stirred steel vessel which was equipped with metering apparatuses and automatic internal temperature control was rendered oxygen-free by flushing with nitrogen. Thereafter, 7 l of acetone were initially taken. 3 l of a solution of 20 kg of maleic anhydride in 28 kg of acetone, which served as feed 1, were added. Feed 2 consisted of 17.6 l of vinyl methyl ether, of which 1 l was added. The initially taken mixture was then heated to 65° C. under superatmospheric pressure. At 60° C., 1 l of feed 3, which consisted of 300 g of 2,2'-azobis-(2,4-dimethylvaleronitrile) in 6 kg of acetone, was added. Initial polymerization was carried out for 15 minutes at 65° C., after which, at this internal temperature, feed 1 and feed 2 were introduced in the course of 4 hours and feed 3 in the course of 6 hours. Because of the exothermic reaction, the bath temperature during the first 4 hours was always about 5° C. lower than the internal temperature. The pressure was constant at about 2 bar. After the end of the polymerization, the pressure was carefully let down and about 15 l of acetone were distilled off under atmospheric pressure. A pale reddish polymer solution having a solids content of 61.8% was obtained. The K value of the polymer was 42.6. The content of monomeric maleic anhydride in the solution was 0.5% by weight.

This polymer solution was heated to 100° C. under superatmospheric pressure, after which a solution of 40 g of p-toluenesulfonic acid in 20 l of ethanol was added at this temperature and stirring was continued for 4 hours at the same temperature. After these 4 hours, the mixture was cooled to about 65° C., the pressure was let down and distillation was carried out under atmospheric pressure until a distillation temperature of 78° C. was reached. Whenever the limit of stirrability was reached, 10 l of ethanol were added (6 times in total). After the end of distillation, 600 g of 30% strength hydrogen peroxide were added and the mixture was heated at 100° C. for 2 hours under superatmospheric pressure. After the solution had cooled, its solids content was brought to 50% with ethanol. The resulting polymer had a K value of 36.2. The acid number of the solution was 137 mg of KOH/g. The solution still contained 2.0% of acetone, possessed a strong yellow coloration and had a color number of 7 on the iodine scale.

Examples 1 to 4 illustrate the effect of the novel procedure on the conversion in the polymerization and the color properties of the end product and demonstrate the superiority of the novel process.

Comparative Examples 1 to 3 show that a procedure not according to the invention for the polymerization or esterification leads to a poorer conversion and greatly inferior color properties.

We claim:

1. A process for the preparation of a copolymer of a mono-lower alkyl maleate and a vinyl lower alkyl ether followed by reaction with a lower alkanol, which comprises reacting maleic anhydride with a molar excess of a vinyl lower alkyl ether in each phase of polymerization, wherein said polymerization is carried out in acetone, said acetone being removed by distillation either during or after product ester formation at up to about 70° C., and further wherein said molar excess of vinyl lower alkyl ether is from a molar excess sufficient to achieve substantially complete conversion of maleic anhydride to up to about 15 mol%.

2. The process as claimed in claim 1, wherein the copolymerization is carried out under superatmospheric pressure at from 50° to 100° C.

3. The process as claimed in claim 1, wherein the free radical initiator used is an azo compound.

4. The process as claimed in claim 1, wherein the free radical initiator used is 2,2'-azobis-(2,4-dimethylvaleronitrile).

5. The process as claimed in claim 1, wherein the acetone is removed under reduced pressure.

6. The process as claimed in claim 1, wherein the alkyl vinyl ether is methyl vinyl ether.

7. The process as claimed in claim 1, wherein the alkanol is a lower alkanol of 1 to 4 carbon atoms.

8. The process as claimed in claim 1, wherein the alkanol is ethanol or n-butanol.

9. The process as claimed in claim 2, wherein the copolymerization is carried out at from 55° to 75° C.

10. The process as claimed in claim 1, wherein the product copolymer is up to 70% by weight of the acetone solution.

11. The process as claimed in claim 1, wherein said alkanol is added at a temperature of about 50° to 70° C.

* * * * *